United States Patent [19]
Kohlpaintner et al.

[11] Patent Number: 4,647,104
[45] Date of Patent: Mar. 3, 1987

[54] SLIDING AND LIFTING ROOF FOR VEHICLES HAVING A TILT-OUT GUIDE ARRANGEMENT

[75] Inventors: Georg Kohlpaintner, Martinsried; Arpad Fuerst, Munich; Horst Bienert, Gauting, all of Fed. Rep. of Germany

[73] Assignee: Webasto-Werk W. Baier GmbH & Co., Fed. Rep. of Germany

[21] Appl. No.: 732,135

[22] Filed: May 9, 1985

[30] Foreign Application Priority Data

May 9, 1984 [DE] Fed. Rep. of Germany ....... 3417098

[51] Int. Cl.$^4$ .............................. B60J 7/05; B60J 7/19
[52] U.S. Cl. ..................................... 296/221; 296/224
[58] Field of Search ................ 296/216, 221, 222, 224

[56] References Cited

U.S. PATENT DOCUMENTS

| | | | |
|---|---|---|---|
| 3,960,404 | 6/1976 | Bienert | 296/221 |
| 4,332,416 | 6/1982 | Lutz et al. | 296/216 |
| 4,350,385 | 9/1982 | Schatzler | 296/222 |
| 4,364,601 | 12/1982 | Katayama et al. | 296/221 |
| 4,403,805 | 9/1983 | Strem, Jr. et al. | 296/222 X |
| 4,566,730 | 1/1986 | Knabe et al. | 296/221 |

FOREIGN PATENT DOCUMENTS 157619 12/1981 Japan ................................... 296/222

Primary Examiner—Robert B. Reeves
Assistant Examiner—Dennis H. Pedder
Attorney, Agent, or Firm—Sixbey, Friedman & Leedom

[57] ABSTRACT

A sliding and lifting roof for vehicles having a cover that is guided in lateral guide rails and that can selectively be either lowered at its rear side out of an opening in the roof and then slid back under a fixed part of the roof, or tilted out so that its rear side is lifted above the fixed part of the roof. The cover, close to its rear edge, at each side, has a hold-down device which, when the cover is tilted out, passes through an opening in the corresponding guide rail, and when the cover is being closed, engages against an upstanding guide surface in the area of the rear edge of the opening, and which, when the rear side of the cover is being lowered and pushed back under the fixed part of the roof, dips into the guide rail and is secured by said guide rail against upward adjusting movements. The ability to prevent rearward shifting of the cover is improved by providing, close to a front edge of the cover, on each side, an additional hold-down device which, when the rear edge of the cover is lowered below the fixed part of the roof, can be slid along the guide rail and which, when the cover is tilted out, contacts a rear-side guide connected with the guide rail, said rear-side guide remaining engaged with the additional hold-down device throughout the continued range of movement of the cover to a fully tilted out position.

20 Claims, 4 Drawing Figures

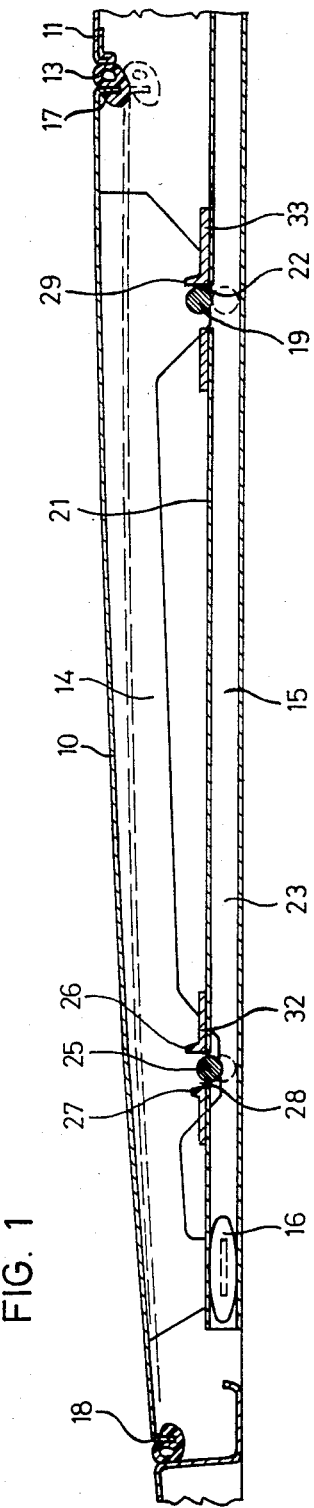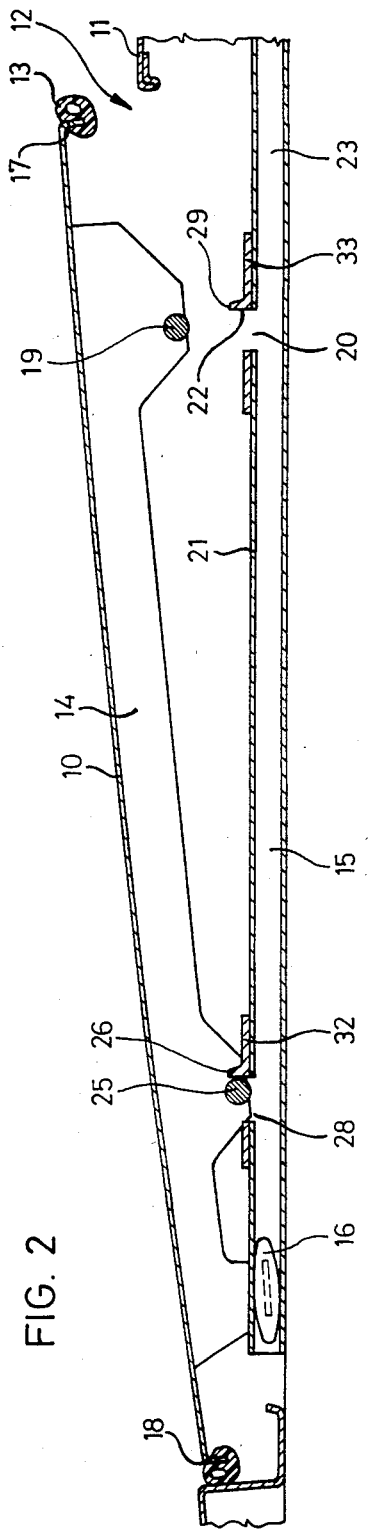

though only the front sliding block 16 is shown that is mounted on the connecting link 14.

SLIDING AND LIFTING ROOF FOR VEHICLES HAVING A TILT-OUT GUIDE ARRANGEMENT

BACKGROUND AND SUMMARY OF THE INVENTION

This invention relates to a sliding roof for vehicles having a cover that is guided in lateral guide rails and that can selectively be either lowered at its rear side out of an opening in the roof and then slid back under a fixed part of the roof, or tilted so that its rear side is lifted above the fixed part of the roof. In particular, the cover near its edge carries a hold-down device at each side which, when the cover is tilted out, penetrates through an opening of a respective guide rail, the hold-down member contacting against an upstanding guide surface in the area of the rear edge of the opening when the cover is closed and which, when the rear side of the cover is being lowered and pushed back under the fixed part of the roof, dips into the guide rail and is secured by said guide rail against upward shifting movements.

In the case of sliding roofs of this type, as is known from U.S. Pat. No. 4,350,385, the hold-down device, when the cover swivels out, after a fraction of the pivoting angle corresponding to the full tilting-out path, disengages from the associated guide surface, and because of the unavoidable manufacturing tolerances and/or assembly tolerances and/or under the influence of the wind forces affecting the cover (which during fast driving may be considerable), it may happen that the rear edge of the cover, or a sealing means mounted at the rear edge of the cover, may engage on the rear edge of the opening in the roof or that the hold-down device may strike on the top side of the guide surface when the cover is lowered. In both cases, a perfect closing of the cover is impaired or made impossible. An extension of the guide surface in an upward direction, in order to avoid this problem, is impossible because the cover, during the pushing-back process, must be able to have its front edge or a sealing means mounted at the front edge of the cover pass over the guiding surface.

The invention, therefore, has an objective of providing a sliding roof for a motor vehicle where the cover is guided when fully tilted-out, when partially tilted-out as well as during the tilting-out movement in an improved manner that avoids a jamming of the cover in the rear edge area.

Based on a sliding roof for vehicles of the initially mentioned type, this objective, according to the invention, is achieved by the fact that the cover, near its front edge, carries an additional hold-down device at each side that, when the cover is lowered under the fixed part of the roof, can be slid along the guide rail and which, when the cover is tilted out, engages against a rear-side guide connected with the guide rail, said rear-side guide remaining in engagement with the additional hold-down device even when the cover is fully tilted out.

Thus, each of the two additional hold-down devices engage the respective guide throughout the complete pivoting range of the cover. As a result, the cover is fixed against undesired backward shifts irrespective of the fact that it may be positioned in the area between the closed position and the fully tilted-out position. As a result, the cover is always able to perfectly move into the closed position, and jamming in rear edge area is impossible.

The term "close to its front edge", in this connection, should be understood to mean a location close enough to the axis about which the cover is tilted that the guide interacting with the additional hold-down device can extend sufficiently far in an upward direction as to remain engaged with the additional hold-down device even when the cover is fully tilted out without interferring with the pushing-back of the cover after the lowering of the rear side of the cover under the fixed part of the roof.

In accordance with a most preferred embodiment of the invention, the additional hold-down device also engages with a front-side guide, over the full pivoting range of the cover, in order to exclude unintended shifts of the cover, also, to the front.

The rear-side guide and/or the front-side guide may be part of a guide plate fastened to the guide rail, in which case the guide surface interacting with the rear hold-down device may also be developed at said guide plate. As a result, adjustments of position of the guides are possible with respect to the guide rails. However, the guides may also be shaped onto the guide rail as an integral part thereof.

The hold-down devices are preferably fastened or shaped onto connecting links provided on both sides of the cover and which are part of a cover-raising mechanism. An especially simple construction is obtained when the hold-down devices have the shape of pins, the shafts of which are essentially in parallel to a pivotal shaft of the cover located close to the front edge of the cover.

These and further objects features and advantages of the present invention will become more obvious from the following description when taken in connection with the accompanying drawings which show, for purposes of illustration only, plural embodiments in accordance with the present invention.

BRIEF DESCRIPTION OF THE DRAWINGS

FIG. 1 is a longitudinal section through a sliding roof of a vehicle, where the cover is shown in solid lines in the closed position and in broken lines in a position where its rear edge is lowered;

FIG. 2 is a section according to FIG. 1 when the cover is tilted out, for a modified embodiment;

DETAILED DESCRIPTION OF THE PREFERRED EMBODIMENT

Figure 3:
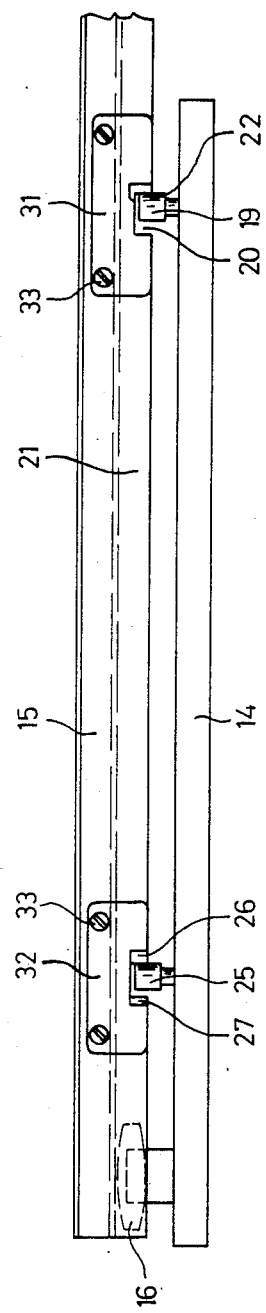
FIG. 3 is a top view of the right guide rail and the right connecting link of the roof according to FIG. 1.

The sliding roof shown in FIGS. 1 and 3 has a cover 10 which, in the closed position shown in FIG. 1 by solid lines, closes an opening 12 formed in a fixed part 11 of the roof. The cover 10 has a sealing means 13 that surrounds it on all sides, and a connecting link 14 is fastened on each side of the cover and extends in a longitudinal direction of the vehicle. A lateral guide rail 15, similarly, extends longitudinally at each side of the opening 12 of the roof, but is connected with the fixed part 11 of the roof. The cover 10 is guided in guide rails 15 via sliding blocks of which, for reasons of illustrational simplicity, only the front sliding block 16 is shown that is mounted on the connecting link 14.

Via a drive of a known type that is not shown (such as a drive according to U.S. Pat. No. 4,332,416), the cover 10, starting from the closed position, can be lowered with its rear edge 17 and can then be pushed toward the rear under the fixed part 11 of the roof or, as shown in FIG. 2, can be tilted upward above the fixed part 11 of the roof. The connecting link 14, in this case, forms part of an also known cover-raising mechanism (see U.S. Pat. No. 4,332,416, which is incorporated by reference). During the transition from the closed position according to FIG. 1 into the tilted-out position of FIG. 2, the cover 10 is pivoted about an axis located close to its front edge 18 and extending transversely to the sliding direction of the cover which, in the illustrated embodiment, is determined by the front sliding blocks 16 which can be elastically deformed during the pivotal movement.

On each side, close to its rear edge 17, the cover 10 has a rear hold-down device 19. The pin-shaped hold-down device 19, when the cover is tilted out, passes through an opening 20 in the upper flange 21 of the guide rail 15. When the cover 10 is closed, the hold-down device 19 rests against an upstanding guide surface 22 in the area of the rear edge of the opening 20. When the rear edge 17 of the cover 10 is lowered (broken line position in FIG. 1), the hold-down device 19 dips into the guiding duct 23 defined by the guide rail 15. Then, if the cover is pushed toward the rear from this lowered position, it is secured against upward shifting movements by engagement of the hold-down device 19 with the flange 21.

Close to the front edge 18 of the cover 10, a front hold-down device 25, like the rear hold-down device 19, is mounted to the connecting link 14. The hold-down device 25, like the rear hold-down device 19, has the shape of a pin with a shaft that is essentially parallel to the pivotal axis of the cover. The front hold-down device 25 interacts with an upstanding guide surface of a rear-side guide 26 and a front-side guide 27 whenever the cover is located in the range between the closed position (FIG. 1) and the fully tilted-out position (FIG. 2). When the rear edge 17 of the cover 10 is lowered (broken line position in FIG. 1), the front hold-down device 25 dips into the opening 28 of the flange 21 located between the guides 26, 27. When the cover 10 is subsequently pushed toward the rear, the hold-down device 25, like the hold-down device 19, slides along the guiding duct 23. As a result, the cover is stabilized more. When the cover 10 is pushed back, the sealing means 13 does not strike against the upper edges of the guide surface 22 as well as the guides 26, 27.

Additionally, because the front hold-down device 25 interacts with the rear-side guide 26 when the rear hold-down device 19 is disengaged from the guide surface 22 (FIG. 2) it prevents a shifting of the cover 10 toward the rear. As a result, when the cover is pivoted back down, a jamming of the rear edge 17 of the cover 10 or the sealing means 13 at the rear border of the opening 12 of the roof, or an engagement of the rear hold-down device 19 on the top end 29 of the guide surface 22 is securely avoided. This, in turn, ensures that cover 10 moves precisely into the closed position and the sealing means 13 is not subjected to wear.

The embodiment according to FIG. 2 differs from that of FIG. 1 because of the fact that the front-side guide 27 that interacts with the front hold-down device 25 has not been provided.

In the case of the embodiment of FIG. 1, as seen clearly in FIG. 3, the guide surface 22 is part of a rear guide plate 31, while the guides 26, 27 are formed on a front guide plate 32. The guide plates 31, 32 are fixed on the upper flange 21 of the guide rail 15, preferably, as shown by means of screws 33. For purposes of longitudinal positional adjustment, the guide plates may be mounted in the manner disclosed in detail in the above-mentioned U.S. Pat. No. 4,350,385, to which reference can be made for an understanding thereof.

Figure 4:
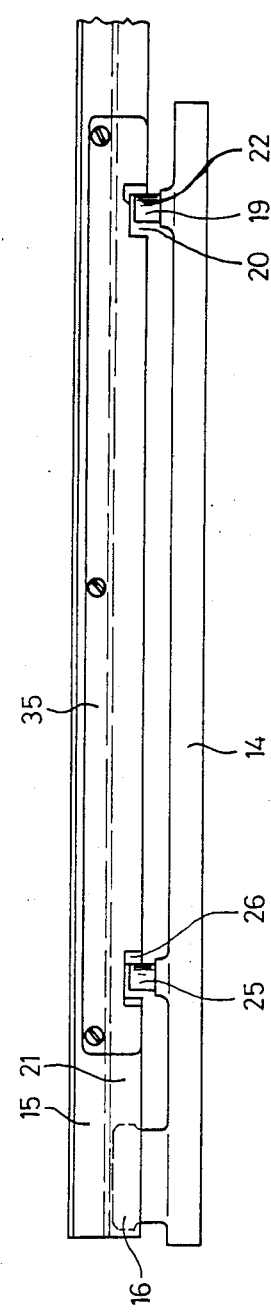
FIG. 4 is a top view corresponding to FIG. 3 for an embodiment of the invention that has been modified further.

In the case of the embodiment according to FIG. 4, the guide surface 22 and the guides 26, 27 are formed on a single guide plate 35 which, at the same time, provides a reinforcement of the guide rail 15. In the case of this embodiment, the hold-down devices 19, 25 are formed by pin-shaped parts that are injection-molded onto the connecting link 14 and project laterally.

Naturally, other embodiments are possible. For example, the guides 26, 27 and/or the guide surfaces 22 may be molded directly onto the guide rail 15. For adjusting purposes, the hold-down device 19 and/or the hold-down device 25 may be adjustably connected with the cover 10. A guide that corresponds to the front-side guide 27 may also be provided in the area of the front side of the opening 20.

While we have shown and described plural embodiments in accordance with the present invention, it is understood that the same is not limited thereto, but is susceptible of numerous changes and modifications as known to those skilled in the art, and we, therefore, do not wish to be limited to cover all such changes and modifications as are encompassed by the scope of the appended claims.

We claim:

1. In a sliding and lifting roof for vehicles of the type having a cover that is guided by lateral guide rails and that can selectively be either lowered at a rear edge out of an opening in the roof and pushed back under a fixed part of the roof, or can be tilted out so that its rear edge is lifted upwardly above the fixed part of the roof, said cover, close to its rear edge, carrying a hold-down device at at least one side, which, when the cover is tilted out, penetrates through an opening of a respective one of the guide rails, and when the cover is being closed, engages against an upstanding guide surface in an area of a rear edge of the opening, and which, when the rear edge of the cover is lowered and pushed back under the fixed part of the roof, dips into a respective guide rail and is secured by said guide rail against upward adjusting movements, the improvement for preventing rearward shifting of the cover wherein the cover, close to its front edge, has, at at least one side, an additional hold-down device connected to the cover in a manner precluding relative displacement between the cover and the additional hold-down device, and wherein a rear-side guide is provided for the additional hold-down device, said additional hold-down device being constructed and arranged relative to the rear-side guide and a respective guide rail in a manner that, when the rear edge of the cover is lowered below the fixed part of the roof, the additional hold-down device is slidable along the respective guide rail and, when the cover is tilted out, engages against the rear-side guide therefor and remains engaged therewith when the cover is fully tilted out.

2. A sliding and lifting roof for vehicles according to claim 1, wherein a front-side guide is provided for engaging the additional hold-down device over the whole range of movement of the cover as it is tilted out.

3. A sliding and lifting roof for vehicles according to claim 2, wherein at least one of the rear-side and the front-side guides are part of a guide plate fastened to the guide rail.

4. A sliding and lifting roof for vehicles according to claim 3, wherein the upstanding guide surface is also formed on a guide plate.

5. A sliding and lifting roof for vehicles according to claim 1, wherein the rear-side guide is part of a guide plate fastened to the guide rail.

6. A sliding and lifting roof for vehicles according to claim 5, wherein the upstanding guide surface is also formed on said guide plate.

7. A sliding and lifting roof for vehicles according to claim 6, wherein the hold-down devices are located on a connecting link provided on at least one side of the cover, said connecting link being part of a cover-raising mechanism.

8. A sliding and lifting roof for vehicles according to claim 1, wherein the hold-down devices are located on a connecting link provided on at least one side of the cover, said connecting link being part of a cover-raising mechanism.

9. A sliding and lifting roof for vehicles according to claim 2, wherein the hold-down devices are located on a connecting link provided on at least one side of the cover, said connecting link being part of a cover-raising mechanism.

10. A sliding and lifting roof for vehicles according to claim 3, wherein the hold-down devices are located on a connecting link provided on at least one side of the cover, said connecting link being part of a cover-raising mechanism.

11. A sliding and lifting roof for vehicles according to claim 4, wherein the hold-down devices are located on a connecting link provided on at least one side of the cover, said connecting link being part of a cover-raising mechanism.

12. A sliding and lifting roof for vehicles according to claim 5, wherein the hold-down devices are located on a connecting link provided on at least one side of the cover, said connecting link being part of a cover-raising mechanism.

13. A sliding and lifting roof for vehicles according to claim 12, wherein the hold-down devices have the shape of pins, the shafts of which are essentially parallel to a pivotal axis of the cover that is located close to the front edge of the cover.

14. A sliding and lifting roof for vehicles according to claim 1, wherein the hold-down devices have the shape of pins, the shafts of which are essentially parallel to a pivotal axis of the cover that is located close to the front edge of the cover.

15. A sliding and lifting roof for vehicles according to claim 2, wherein the hold-down devices have the shape of pins, the shafts of which are essentially parallel to a pivotal axis of the cover that is located close to the front edge of the cover.

16. A sliding and lifting roof for vehicles according to claim 3, wherein the hold-down devices have the shape of pins, the shafts of which are essentially paralled to a pivotal axis of the cover that is located close to the front edge of the cover.

17. A sliding and lifting roof for vehicles according to claim 4, wherein the hold-down devices have the shape of pins, the shafts of which are essentially parallel to a pivotal axis of the cover that is located close to the front edge of the cover.

18. A sliding and lifting roof according to claim 1, wherein each said rear-side guide is an upstanding surface projecting upwardly from a rear-side edge of an opening formed in a respective guide rail through which said additional hold-down device passes.

19. A sliding and lifting roof according to claim 18, wherein each said front-side guide is an upstanding surface projecting upwardly from a front-side edge of an opening formed in a respective guide rail through which said additional hold-down device passes.

20. A sliding and lifting roof according to claim 19, wherein said rear-side and front-side guides are part of a guide plate fastened to the guide rail.

* * * * *